United States Patent
Handschuh

(10) Patent No.: US 6,914,986 B2
(45) Date of Patent: Jul. 5, 2005

(54) COUNTERMEASURE METHOD IN AN ELECTRONIC COMPONENT USING A PUBLIC KEY CRYPTOGRAPHY ALGORITHM ON AN ELLIPTIC CURVE

(75) Inventor: Helena Handschuh, Paris (FR)

(73) Assignee: Gemplus, Gemenos (FR)

( * ) Notice: Subject to any disclaimer, the term of this patent is extended or adjusted under 35 U.S.C. 154(b) by 864 days.

(21) Appl. No.: 09/774,674

(22) Filed: Feb. 1, 2001

(65) Prior Publication Data

US 2001/0048742 A1 Dec. 6, 2001

(30) Foreign Application Priority Data

Jun. 2, 2000 (FR) .............................. 00 07109

(51) Int. Cl.$^7$ ................................ H04L 9/00
(52) U.S. Cl. ........................................ 380/30
(58) Field of Search .......................... 380/30

(56) References Cited

U.S. PATENT DOCUMENTS 6,298,135 B1 * 10/2001 Messerges et al. ............. 380/1
6,477,254 B1 * 11/2002 Miyazaki et al. ........... 380/286

FOREIGN PATENT DOCUMENTS

FR  WO 00/59157   * 10/2000
JP  411317734 A   * 11/1999 ............. H04L/9/08

OTHER PUBLICATIONS

Kocher et al., Differential Power Analysis, 1998, Crytography Research Group.*
Koblitz, A Course in Number Theory and Cryptography, 1994, Springer–Verlag New York Inc, second edtion, pp. 178–179.*

* cited by examiner

Primary Examiner—Gregory Morse
Assistant Examiner—Jacob Lipman
(74) Attorney, Agent, or Firm—Burns Doane Swecker & Mathis, LLP

(57) ABSTRACT

The present invention concerns a countermeasure method in an electronic component using a public key cryptography algorithm based on the use of elliptic curves. From a private key d and a number of points n on an elliptic curve, a new deciphering integer d' is calculated. The present invention applies particularly to any existing electronic component, such as a smart card.

13 Claims, No Drawings

COUNTERMEASURE METHOD IN AN ELECTRONIC COMPONENT USING A PUBLIC KEY CRYPTOGRAPHY ALGORITHM ON AN ELLIPTIC CURVE

BACKGROUND OF THE INVENTION

The present invention concerns a novel countermeasure method in an electronic component using a public key ciphering algorithm on an elliptic curve. In the conventional model of secret key cryptography, two persons wishing to communicate by means of a non-secure channel must initially agree on a secret ciphering key K. The ciphering function and the deciphering function use the same key K. The drawback of the secret key ciphering system is that such a system requires the prior communication of the key K between the two persons by means of a secure channel, before any ciphered message is sent through the non-secure channel. In practice, it is generally difficult to find a perfectly secure communication channel, particularly if the distance separating the two persons is great. Secure channel means a channel where it is impossible to know or modify the information passing over that channel. Such a secure channel can be implemented by means of a cable connecting two terminals, in the possession of the two persons.

The concept of public key cryptography was invented by Whitfield Diffie and Martin Hellman in 1976. Public key cryptography makes it possible to resolve the problem of the distribution of the keys over a non-secure channel. The principle of public key cryptography consists of using a pair of keys, for example a public ciphering key and a private deciphering key. It must be unfeasible from the calculation point of view to find the private deciphering key from the public ciphering key. A person A wishing to communicate information to a person B uses the public ciphering key of the person B. Only the person B has the private key associated with his public key. Only person B is therefore capable of deciphering the message sent to him.

Another advantage of public key cryptography over secret key cryptography is that public key cryptography allows the authentication of a document or person or the provenance of a document by virtue of the use of digital signatures. The first embodiment of a public key ciphering scheme was developed in 1977 by Rivest, Shamir and Adleman, who invented the RSA ciphering system. The RSA security is based on the difficulty of factorizing a large number which is the product of two prime numbers. Since then, many public key ciphering systems have been proposed, whose security is based on different calculatory problems. Following is a non-exhaustive list of such systems:

Merckle-Hellman backpack

This ciphering system is based on the difficulty of the problem of summing subsets.

McEliece

This ciphering system is based on the theory of algebraic codes. It is based on the problem of decoding linear codes.

El Gamal

This ciphering system is based on the difficulty of the discrete logarithm in a finite body.

Elliptic curves

The elliptic curve ciphering system constitutes a modification of existing cryptographic systems in order to apply them to the field of elliptic curves.

The use of elliptic curves in cryptographic systems was proposed independently by Victor Miller and Neal Koblitz in 1985. The actual applications of elliptic curves were envisaged at the start of the 1990s. The advantage of cryptosystems based on an elliptic curve is that they provide security equivalent to the other cryptosystems but with lesser key sizes. This saving in key size entails a reduction in memory requirements and a reduction in calculation time, which makes the use of elliptic curves particularly suited to applications of the integrated circuit card type, so-called "smart cards".

An elliptic curve on a finite body $GF(q^n)$ (q being a prime number and n an integer) is the set of points (x,y) with x the abscissa and y the ordinate belonging to $GF(q^n)$ having as its equation:

$$y^2 = x^3 + ax + b$$

if q is greater than or equal to 3 and $$y^2 + xy = x^3 + ax^2 + b$$

if q=2.

The two classes of elliptic curve most used in cryptography are the following classes:

1) Curves defined on the finite body GF(p) (set of integers modulo p, p being a prime number) having the equation:

$$y^2 = x^3 + ax + b$$

2) Elliptic curves on the finite body $GF(2^h)$ having the equation $$y^2 + xy = x^3 + ax^2$$

For each of these two classes of curve, an operation of addition of points is defined: given two points P and Q, the sum R=P+Q is a point on the curve whose coordinates are expressed by means of the coordinates of the points P and Q in accordance with the formulae whose expression is given in the work "Elliptic Curve Public Key Cryptosystem" by Alfred J. Menezes.

This addition operation makes it possible to define a scalar multiplication operation: given a point P belonging to an elliptic curve and an integer d, the result of the scalar multiplication of P by a point d such that Q=d.P=P+P+. . . +P d times.

The security of cryptography algorithms on elliptic curves is based on the difficulty of the discrete logarithm on elliptic curves, said problem consisting, from two points Q and P belonging to an elliptic curve E, of finding, if it exists, an integer x such that Q=x.P.

There are many cryptographic algorithms based on the problem of the discrete logarithm. These logarithms are easily transposable to elliptic curves. Thus it is possible to use algorithms providing authentication, confidentiality, integrity check and key exchange.

A point common to the majority of cryptographic algorithms based on elliptic curves is that they comprise, as a parameter, an elliptic curve defined on a finite body and a point P belonging to this elliptic curve. The private key is an integer d chosen randomly. The public key is a point on the curve Q such that Q=d.P. These cryptographic algorithms generally use scalar multiplication in the calculation of a point R=d.T where d is the secret key.

In this section, a ciphering algorithm based on an elliptic curve is described. This scheme is similar to the El Gamal ciphering scheme. A message m is ciphered as follows:

The coder chooses an integer k randomly and calculates the points k.P=(x1,y1) and k.Q=(x2,y2) on the curve, and the integer c=x2 +m. The ciphered result of m is the triplet (x1,y1,c).

The decoder, who possesses d, deciphers m by calculating:

(x'2,y'2)=d(x1,y1) and m=c−x'2

In order to effect the necessary scalar multiplications in the calculation methods described above, several algorithms exist:
"Double and add" algorithm;
"Addition-subtraction" algorithm;
Algorithm with addition chains;
Algorithm with window;
Algorithm with signed representation.

This list is not exhaustive. The simplest algorithm and the one most used is the "double and add" algorithm. The "double and add" algorithm takes as an input a point P belonging to a given elliptic curve and an integer d. The integer d is denoted d=(d(t),d(t−1), . . . ,d(0)), where (d(t),d(t−1), . . . ,d(0)) is the binary representation of d, with d(t) the most significant bit and d(0) the least significant bit. The algorithm returns the point Q=d.P as an output.

The "double and add" algorithm has two variants, depending on whether the calculations are commenced with the most significant bits or the least significant bits of d.

The first variant includes the following three steps:
1) Initializing the point Q with the value P
2) For i ranging from t to 0:
   2a) Replacing Q by 2Q
   2b) If d(i) 1, replacing Q by Q+P
3) Returning Q.

The second variant includes the following three steps:
1) Initializing the point Q with the point at infinity O and an accumulator A with the value P.
2) For i ranging from 0 to t:
   2a) If d(i)=1, replacing Q by Q+A
   2b) Replacing A by 2A
3) Returning Q.

It became clear that implementing a public key ciphering algorithm of the elliptic curve type on a smart card was vulnerable to attacks consisting of a differential analysis of current consumption, making it possible to find the private deciphering key. These attacks are referred to as DPA, the acronym for Differential Power Analysis. The principle of these DPA attacks is based on the fact that the current consumption of the microprocessor executing the instructions varies according to the data item being manipulated.

In particular, when an instruction is manipulating a data item in which a particular bit is constant, the value of the other bits being able to vary, an analysis of the current consumption related to the instruction shows that the mean consumption of the instruction is not the same depending on whether the particular bit takes the value 0 or 1. An attack of the DPA type therefore makes it possible to obtain additional information on the intermediate data manipulated by the microprocessor in the card during the execution of a cryptographic algorithm. This additional information can in certain cases reveal the private parameters of the deciphering algorithm, making the cryptographic system nonsecure.

Hereinafter a description is given of a method of DPA attack on an algorithm of the elliptic curve type performing an operation of the type involving scalar multiplication of a point P by an integer d, the integer d being the secret key. This attack makes it possible to directly reveal the secret key d. It therefore seriously compromises the security of the implementation of elliptic curves on a smart card.

The first step of the attack is the recording of the current consumption corresponding to the execution of the first variant of the "double and add" algorithm described above for N distinct points P(1), . . . , P(N). In an algorithm based on elliptic curves, the microprocessor of the smart card will perform N scalar multiplications d.P(1), . . . , d.P(N).

For reasons of clarity of the description of the attack, the first step will be to describe a method making it possible to obtain the value of the bit d(t−1) of the secret key d, where (d(t),d(t−1), . . . , d(0)) is the binary representation of d, with d(t) the most significant bit and d(0) the least significant bit. The description of an algorithm which makes it possible to find the value of d is then given.

The points P(1) to P(N) are grouped together according to the value of the last bit of the abscissa of 4.P, where P designates one of the points P(1) to P(N). The first group consists of the points P such that the last bit of the abscissa of 4.P is equal to 1. The second group consists of the points P such that the last bit of the abscissa 4.P is equal to 0. The mean of the current consumptions corresponding to each of the two groups is calculated, and the difference curve between these two means is calculated.

If the bit d(t−1) of d is equal to 0, then the scalar multiplication algorithm previously described calculates and stores in memory the value of 4.P. This means that, during the execution of the algorithm in a smart card, the microprocessor of the card will actually calculate 4.P. In this case, in the first message group the last bit of the data item manipulated by the microprocessor is always 1, and in the second message group the last bit of the data item manipulated is always zero. The mean of the current consumptions corresponding to each group is therefore different. Therefore, in the difference curve between the two means, a current consumption differential peak.

If on the other hand the bit d(t−1) of d is equal to 1, the exponentiation algorithm described previously does not calculate the point 4.P. When the algorithm is executed by the smart card, the microprocessor therefore never manipulates the data item 4.P. Therefore no consumption differential peak appears.

This method therefore makes it possible to determine the value of the bit d(t−1) of d.

The algorithm described in the following paragraph is a generalization of the previous algorithm. It makes it possible to determine the value of the secret key d.

The input is defined by N points denoted P(1) to P(N) corresponding to N calculations made by the smart card and the output by an integer h.

The algorithm is effected as follows in three steps:
1) Execute h=1;
2) For i ranging from t−1 to 1:
   2.1) Classify the points P(1) to P(N) according to the value of the last bit of the abscissa of (4*h).P;
   2.2) Calculate the current consumption mean for each of the two groups;
   2.3) Calculate the difference between the two means;
   2.4) If the difference shows a consumption differential peak, make h=h*2; otherwise make h=h*2+1;
3) Return h.

The above algorithm supplies an integer h such that d=2*h or d=2*h+1. To obtain the value of d, it then suffices to test the two possible hypotheses. The described DPA-type attack therefore makes it possible to find the private key d.

An equivalent attack is applied to the second variant of the scalar multiplication algorithm of the type "double and add", and more generally to all scalar multiplication algorithms on an elliptic curve.

DESCRIPTION OF THE INVENTION

The method of the invention consists of the production of a new countermeasure making it possible to protect against the previously described DPA attack.

This method consists of "masking" the secret key d by multiplying a point P on the elliptic curve by a random value r with the same length.

The countermeasure method of the present invention in an electronic component using a public key cryptography algorithm based on the use of elliptic curves consists of calculating, from the private key d and the number of points n on the elliptic curve, a new deciphering integer d' such that the deciphering of any message, by means of a deciphering algorithm, with d', makes it possible to obtain the same result as with d, by performing the operation Q=d.P, with P being a point on the curve to which the scalar multiplication algorithm is applied. The method of the invention comprises the following steps:

1) Taking a random value r with the same size as d;
2) Calculating the integer d' such that d'=d+r;
3) Performing a scalar multiplication operation whose result is the point Q' on the curve such that Q'=d'.P;
4) Performing a scalar multiplication operation whose result is the point S on the curve such that S=r.P;
5) Calculating the point Q on the curve such that Q=Q'−S.

The advantage of this method compared with the three countermeasures described in French Patent No. 99.03920 is that it makes it possible to provide a countermeasure both different and better suited to certain types of elliptic curves. More precisely, when the scalar multiplication algorithm is effected, according to the second variant of the "double and add" algorithm, the operation of duplicating the point P is common to the calculation of the points Q'=d'.P and S=r.P. The additional calculation time for this countermeasure is therefore reduced to the addition operations performed during the calculation of the point S=r.P. This has an indisputable advantage when elliptic curves are used for which the duplication of a point is an operation as expensive in calculation time as the addition of two points.

The present method is distinguished, compared with the countermeasure of French Patent No. 99.03920, in that the random value r is an integer which masks the deciphering integer d rather than a random point on the curve which masks the point P, and in that the calculation of the result Q includes a step of calculating the point S=r.P, which is not necessary in the technique of French Patent No. 99.03920 when the random value r is a multiple of the number n of points on the curve.

The countermeasure method of the invention includes three variants.

The first variant consists of the fact that a counter is incremented at each new execution of the deciphering algorithm. During the first execution of the deciphering algorithm, the algorithm is executed according to the five-step method described previously. As long as the counter has not reached the limit value T, steps 1 to 4 of the method described previously are not executed, the point S keeping the value taken during the previous execution. When the counter attains the limit value T, the deciphering algorithm is effected according to the method described above in five steps, and the counter is reset to zero. In practice, T can be equal to 16.

The second variant consists of the card initially having in memory a point on the elliptic curve such that S=r.P. Steps 1 and 4 of the previous deciphering algorithm are replaced by the following steps 1' and 4':

1') Replace r by 2.r.
4') Replace S by 2.S.

The third variant consists of a modification of the second variant, wherein a counter is incremented at each new execution of the deciphering algorithm. During the first execution of the deciphering algorithm, the algorithm is executed according to the five-step method of the second variant described above. As long as the counter has not reached a limit value T, steps 1' and 4' of the previously described method are not executed, the point S keeping the value taken during the previous execution. When the counter reaches a limit value T, the deciphering algorithm is effected according to the previously described five-step method, and the counter is reset to zero. In practice, T can be equal to 16.

The application of this countermeasure method makes it possible to protect any cryptographic algorithm based on elliptic curves against the previously described DPA attack. The present countermeasure supplements the three countermeasures presented by French Patent No. 99.03920 and can be combined with any one of these three countermeasures in order to form a new one. It applies to any electronic component, of the type consisting of an integrated circuit for a smart card, for example.

What is claimed is:

1. A countermeasure method in an electronic component using a public key cryptography algorithm based on the use of elliptic curves in which a private key d and the number of points n on an elliptic curve are used to calculate a new deciphering integer d' such that the deciphering of any message, by means of a deciphering algorithm, with d' makes it possible to obtain the same result as with d, by performing the operation Q=d.P, where P is a point on the curve to which the scalar multiplication algorithm is applied, said method comprising the following steps:

1) taking a random value r with the same size as d;
2) calculating an integer d' such that d'=d+r;
3) Performing a scalar multiplication operation whose result is a point Q' on the curve such that Q'=d'.P;
4) Performing a scalar multiplication operation whose result is a point S on the curve such that S=r.P; and
5) calculating the point Q on the curve such that Q=Q'−S.

2. A countermeasure method according to claim 1, wherein a new deciphering integer d' is calculated at each new execution of the deciphering algorithm.

3. A countermeasure method according to claim 1, further including the step of incrementing a counter at each new execution of the deciphering algorithm up to an integer value T.

4. A countermeasure method according to claim 3, wherein once the value T has been reached, a new deciphering integer d' is calculated according to the method of claim 1, the counter is reset to zero and the point S=r.P is stored in memory.

5. A countermeasure method according to claim 4 wherein the value T is equal to 16.

6. A countermeasure method according to claim 3 wherein the value T is equal to 16.

7. A countermeasure method according to claim 1, wherein the point S is stored in memory, and steps 1 and 4 are replaced by the following steps 1' and 4':

1') replace r by 2.r
4') replace S by 2.S.

8. A countermeasure method according to claim 7, wherein a new deciphering integer d' is calculated at each new execution of the deciphering algorithm.

9. A countermeasure method according to claim 7, further including the step of incrementing a counter at each new execution of the deciphering algorithm up to a value T.

10. A countermeasure method according to claim 9, wherein, once the value T has been reached, a new deciphering integer d' is calculated according to the method of claim 7, and the counter is reset to zero.

11. A countermeasure method according to claim 10 wherein the value T is equal to 16.

12. A countermeasure method according to claim 10 wherein the value T is equal to 16.

13. An electronic component having an integrated circuit which executes a public key cryptography algorithm based on the use of elliptic curves in which a private key d and the number of points n on an elliptic curve are used to calculate a new deciphering integer d' such that the deciphering of any message, by means of a deciphering algorithm, with d' makes it possible to obtain the same result as with d, by performing the operation Q=d.P, where P is a point on the curve to which the scalar multiplication algorithm is applied, said circuit executing the following steps:

1) taking a random value r with the same size as d;
2) calculating an integer d' such that d'=d+r;
3) Performing a scalar multiplication operation whose result is a point Q' on the curve such that Q'=d'.P;
4) Performing a scalar multiplication operation whose result is a point S on the curve such that S=r.P; and
5) calculating the point Q on the curve such that Q=Q'−S.

* * * * *